United States Patent
Todd et al.

(10) Patent No.: US 7,539,838 B1
(45) Date of Patent: May 26, 2009

(54) METHODS AND APPARATUS FOR INCREASING THE STORAGE CAPACITY OF A STORAGE SYSTEM

(75) Inventors: Stephen J. Todd, Shrewsbury, MA (US); Jeffrey A. Brown, Shrewsbury, MA (US); James W. Espy, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 529 days.

(21) Appl. No.: 11/324,646

(22) Filed: Jan. 3, 2006

(51) Int. Cl.
*G06F 12/00* (2006.01)

(52) U.S. Cl. .................. 711/170; 711/112; 711/114; 711/171; 711/172

(58) Field of Classification Search .............. 711/112, 711/114, 170–172
See application file for complete search history.

(56) References Cited

U.S. PATENT DOCUMENTS 6,304,942 B1 * 10/2001 DeKoning ............... 711/114

OTHER PUBLICATIONS

U.S. Appl. No. 11/324,639, filed Jan. 3, 2006, Mikhail Zelikov, et al.
U.S. Appl. No. 11/324,728, filed Jan. 3, 2006, Mikhail Zelikov, et al.
U.S. Appl. No. 11/324,644, filed Jan. 3, 2006, Philippe Armangau, et al.

* cited by examiner

*Primary Examiner*—Jasmine Song
(74) *Attorney, Agent, or Firm*—Krishnendu Gupta; Penelope S. Wilson

(57) ABSTRACT

One embodiment is directed to an object addressable storage (OAS) system that has a plurality of storage devices to store a plurality of content units. The OAS system provides an OAS interface so that each one of the content units stored on the OAS system can be accessed using an object identifier. The OAS system is capable of discovering the addition of newly added storage devices to the plurality of storage devices after the OAS system has been at least partially populated so that at least some of the plurality of storage devices have content units already stored thereon, and in response to the discovery of newly added storage devices, configuring the newly discovered storage devices to increase the storage capacity of the OAS system and to enable content units to be stored thereon.

18 Claims, 8 Drawing Sheets

METHODS AND APPARATUS FOR INCREASING THE STORAGE CAPACITY OF A STORAGE SYSTEM

FIELD OF THE INVENTION

The invention relates to techniques for configuring a storage system.

DESCRIPTION OF THE RELATED ART

Content addressable storage (CAS) is a technique by which a content unit stored on a storage system is accessed using an address or identifier that is at least partially derived from the content of the content unit. As an example, a content unit may be provided as input to a hashing function which generates a hash value that is used as at least part of the content address for the content unit. An example of a hashing function suitable for generating content addresses is the message digest 5 (MD5) hashing algorithm.

When a host computer sends a request to a content addressable storage system to retrieve a unit of data, the host computer provides the content address of the content unit. The storage system then determines, based on the content address, the physical location of the content unit in the storage system, retrieves the content unit, and returns the content unit to the host computer. Thus, the host computer need not be aware of the physical location of the content on the storage system, as the task of determining the physical location of the content unit based on the content address may be performed by the storage system.

SUMMARY OF THE INVENTION

One embodiment of the invention is directed to a method for use in a computer system comprising at least one host, at least one storage system and at least one communication medium that couples the at least one host to the at least one storage system, the at least one storage system comprising a first group of storage devices and a second group of storage devices, the storage system further comprising a first controller and a second controller, the first controller comprising a first file system that maps a first set of content units to storage locations on the first group of storage devices, the second controller comprising a second file system that maps a second set of content units to storage locations on the second group of storage devices, the at least one host accessing the first group of content units via the first controller and the second group of content units via the second controller. The method comprises an act of: (A) in response to a failure that prevents the at least one host from accessing the first group of content units via the first controller, mounting the first file system on the second controller to enable the at least one host to access the first group of content units via the second controller. Another embodiment is directed to at least one computer readable medium encoded with instructions that, when executed on a computer system, perform the above-described method.

A further embodiment is directed to a storage system coupled to a host computer by at least one communication medium. The storage system comprises: a first group of storage devices; a second group of storage devices; a first controller comprising a first file system that maps a first set of content units to storage locations on the first group of storage devices; a second controller comprising a second file system that maps a second set of content units to storage locations on the second group of storage devices, wherein the first group of content units are accessible to the host via the first controller and the second group of content units are accessible to the host via the second controller; and at least one controller that, in response to a failure that prevents the at least one host from accessing the first group of content units via the first controller, mounts the first file system on the second controller to enable the at least one host to access the first group of content units via the second controller.

Another embodiment is directed to a method for use in a computer system comprising at least one host, at least one object addressable storage (OAS) system and at least one communication medium that couples the at least one host to the at least one OAS system, the at least one OAS system having a plurality of storage devices and storing a plurality of content units on the plurality of storage devices, each of the at least one host and the at least one OAS system having software that provides a OAS interface so that each one of the content units stored on the OAS system is identified between the at least one host and the at least one OAS using an object identifier, wherein the computer system maps the object identifier for a first of the plurality of content units to at least one of the plurality of storage devices over at least one first path. The method comprises an act of: (A) in response to a failure that prevents the at least one host from accessing the first content unit via the at least one first path, automatically reconfiguring the computer system to establish at least one previously non-established second path that enables the at least one host to access the first content unit using the object identifier for the first content unit. A further embodiment is directed to at least one computer readable medium encoded with instructions that, when executed on a computer system, perform the above-described method.

Another embodiment is directed to an object addressable storage (OAS) system for use in a computer system comprising the OAS system, at least one host, and at least one communications medium that couples the OAS system to the at least one host. The OAS system comprises: a plurality of storage devices for storing a plurality of content units; an OAS interface through which each one of the content units stored on the OAS system is capable of being identified between the at least one host and the at least one OAS using an object identifier; a mapper that maps the object identifier for a first of the plurality of content units to at least one of the plurality of storage devices over at least one first path; and at least one controller that, in response to a failure that prevents the at least one host from accessing the first content unit via the at least one first path, automatically reconfigures the computer system to establish at least one previously non-established second path that enables the at least one host to access the first content unit using the object identifier for the first content unit.

A further embodiment is directed to an object addressable storage (OAS) system, comprising: a plurality of storage devices to store a plurality of content units; and at least one processor programmed to: provide an OAS interface so that each one of the content units stored on the OAS system can be accessed using an object identifier; discover the addition of newly added storage devices to the plurality of storage devices after the OAS system has been at least partially populated so that at least some of the plurality of storage devices have content units already stored thereon; and in response to the discovery of newly added storage devices, configure the newly discovered storage devices to increase the storage capacity of the OAS system and to enable content units to be stored thereon.

Another embodiment is directed to a method of increasing the storage capacity of an object addressable storage (OAS) system comprising a plurality of storage devices to store a plurality of content units, wherein the OAS system provides an OAS interface through which each one of the content units stored on the OAS system can be accessed using an object identifier. The method comprises: discovering the addition of newly added storage devices to the plurality of storage devices after the OAS system has been at least partially populated so that at least some of the plurality of storage devices have content units already stored thereon; and in response to the discovery of newly added storage devices, configuring the newly discovered storage devices to increase the storage capacity of the OAS system and to enable content units to be stored thereon. A further embodiment is directed to at least one computer readable medium encoded with instructions that, when executed on a computer system, perform the above-described method.

Another embodiment is directed to an object addressable storage (OAS) system to store a plurality of content units, the OAS system comprising: a plurality of access nodes that provide a content addressable interface for the OAS system so that each one of the content units can be accessed from the OAS system by providing to the OAS system an object identifier; and a non-OAS storage resource that provides a plurality of storage locations to store the plurality of content units, the non-OAS storage resource providing a non-OAS interface to the plurality of access nodes so that the plurality of access nodes can access the plurality of content units via the non-OAS interface; wherein the plurality of access nodes share the non-OAS storage resource and each of the plurality of access nodes has metadata that maps the content address for each of the content units stored on the OAS system to corresponding ones of the plurality of storage locations on which the content unit is stored so that each of the access nodes can directly access each of the content units stored on the OAS.

A further embodiment is directed to a method of accessing one of a plurality of content units stored on an object addressable storage (OAS) system, the OAS system comprising a plurality of access nodes that provide a content addressable interface for the OAS system so that each one of the content units can be accessed from the OAS system by providing to the OAS system an object identifier; and a non-OAS storage resource that provides a plurality of storage locations to store the plurality of content units, the non-OAS storage resource providing a non-OAS interface to the plurality of access nodes so that the plurality of access nodes can access the plurality of content units via the non-OAS interface. The method comprises: receiving, at one of the plurality of access nodes, a request to access the one of the plurality of content units, wherein the request identifies the one of the plurality of content units using an object identifier; and determining, using metadata available to each of the plurality of access nodes, a corresponding one of the plurality of storage locations at which the content unit is stored. Another embodiment is directed to at least one computer readable medium encoded with instructions that, when executed on a computer system, perform the above-described method.

DETAILED DESCRIPTION

Content addressable storage (CAS) systems exist, as described in the patent applications listed below in Table 1, and provide location independent access to content units stored thereon. That is, an entity accessing a content unit on a CAS system need not be aware of the physical or logical storage location of the content unit, but rather may access the content unit by providing a content address associated with the content unit to the CAS system. Many of these CAS systems are implemented as systems specifically configured for content addressable storage. As described in U.S. patent application Ser. Nos. 11/165,102, 11/165,103, 11/165,104, listed below in Table 1, Applicants have appreciated that a software interface may be used to provide content addressable storage, while employing the underlying storage resources of a non-CAS storage system (e.g., a block I/O storage system). This allows a user to obtain the benefits of CAS without having to purchase a new storage system. That is, a user who already owns a block I/O storage system may use the software CAS interface to use the block I/O storage system as if it were a CAS system.

Aspects of the invention relate to techniques developed for providing a CAS interface in front of a block I/O storage system.

In one embodiment, it is desirable to ensure that all content units stored on a storage box are accessible in event of a failure of a disk controller (or other connection, such as, for example, a cable) that controls access to some of the disks in the box. In one embodiment, this may be accomplished by, in the event of a failure, mounting the file system that maps to content unit stored via the failed controller onto a surviving controller.

In another embodiment, in the event of a failure that prevents a host from accessing a content unit, a previously non-established path to the content unit may be configured that enables the host to access the content unit.

In a further embodiment, when the storage devices of a storage system are at or near capacity, new storage devices may be added to the storage system and automatically configured to enable content units to be stored thereon (e.g., via a CAS interface).

In another embodiment, the storage system may include a plurality of access nodes that provide a CAS interface to a non-CAS storage resource. The plurality of access nodes may share the non-CAS storage resource and each of the plurality of access nodes may be capable of mapping a content address of a content unit stored on the non-CAS storage resource to a storage location on the non-CAS storage resource at which the content unit is stored so that each access node can directly access each content unit on the storage system.

Figure 1:
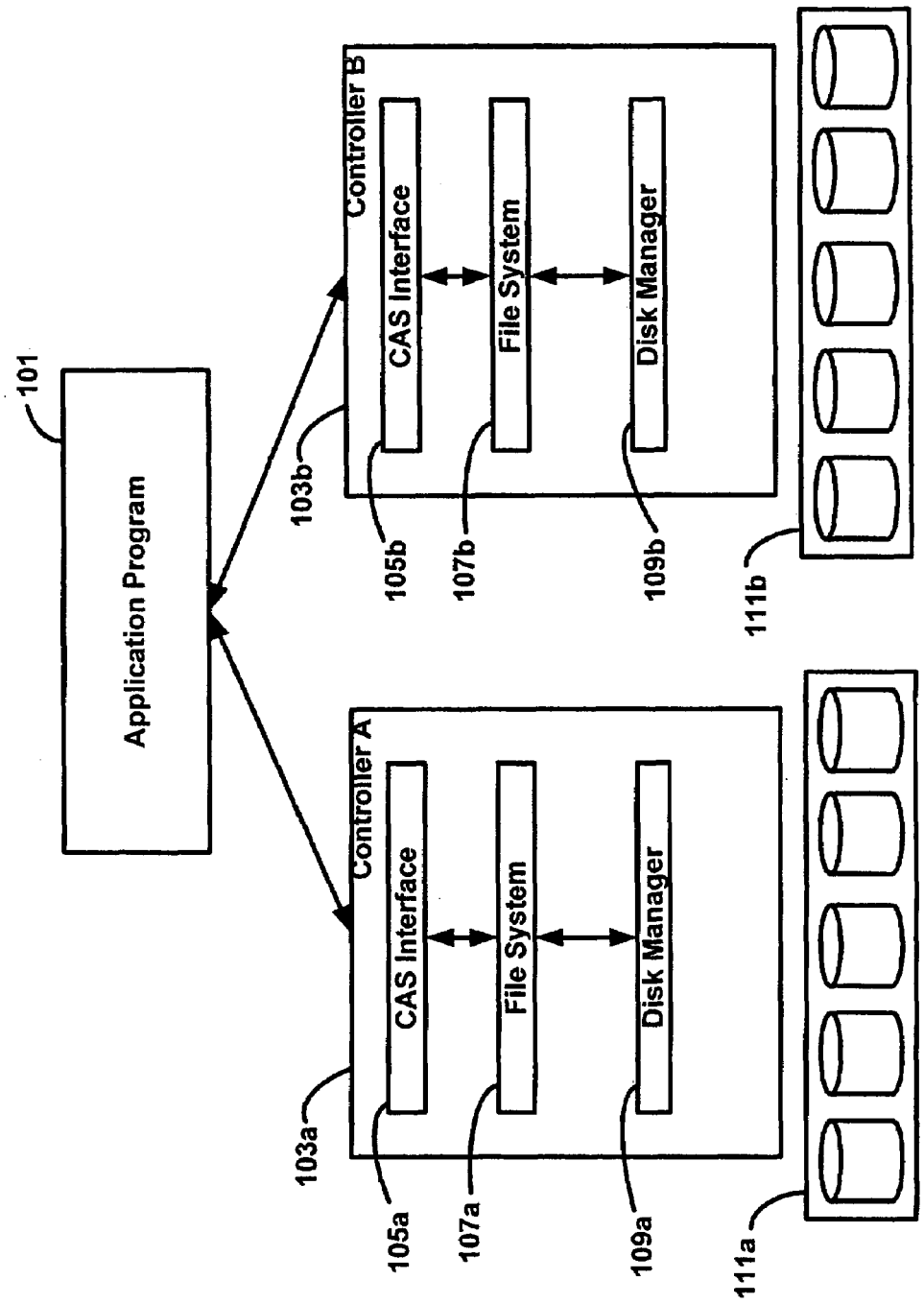
FIG. 1 is a diagram of a computer system in which a content addressable storage (CAS) interface is provided on a plurality of storage devices, in accordance with one embodiment of the invention.

One embodiment of the invention is illustrated in FIG. 1. In FIG. 1, a CAS interface 105 is provided to enable an application program 101 to access content units on disk arrays 111a and 111b by specifying the content addresses of the content units. Disk array 111a is managed by controller 103a and disk array 111b is managed by controller 103b. In accordance with one embodiment, CAS interfaces 105a and 105b provide an interface that allows the application program 101 to access content units stored on disk arrays 111a and 111b, respectively. For example, CAS interface 105a may receive a request from application program 101 to store a particular content unit. CAS interface 105a may store the content unit in a file (or in multiple files) in file system 107a. File system 107a may translate the file system location at which CAS interface 105a stored the content unit into a block storage address on disk array 111a. As discussed in greater detail below, this block storage address may be either a physical storage address or a logical storage address. Disk manager 109a may then physically store the content unit on one or more of the disks in disk array 111a.

The file system in which CAS interface 105a stores content units may be organized in any suitable way, as the invention is not limited in this respect. For example, in one embodiment, the file system may be organized based on content addresses such that content units with similar content addresses are stored in the same directory. In another embodiment, the file system may be organized based on time of storage, so that content units stored proximate in time to one another are stored in the same directory. Examples of file systems organized based on content addresses and time of storage are described in the applications listed in Table 1 below, but the embodiments of the invention are not limited to these or any specific file system schemes.

For a read request that identifies the requested content unit by its content address, CAS interface 105a may determine the file system location of the file in which the requested content unit is stored (e.g., using its content address). In response to CAS interface 105a accessing the file (or files), file system 107a may translate the file system location at which the file (or files) is stored into a block storage address (either physical or logical) at which the file that includes the content unit is stored. Disk manager 109a may then retrieve the content unit from disk array 111a.

The examples above describe the processing of read and write requests by CAS interface 105a on controller 103a. It should be appreciated that read and write requests received by CAS 105b on controller 103b to access content on disk array 111b may processed in a similar manner.

In accordance with one embodiment, content units can be stored on an underlying storage system that provides protection against corruption of data and/or hardware failure. For example, if data stored on one of the disks in disk array 111a or 111b becomes corrupted, it may be desirable to be able to reconstruct the corrupted data. Additionally, if one or more disks in disk array 111a or 111b or one of controllers 103a or 103b fail (e.g., due to hardware failure), it may be desirable to be able to continue to provide access to the data.

Protection against corruptions and hardware failures may be performed in any suitable way, as the invention is not limited in this respect. In accordance with one embodiment, aspects of the present invention can be implemented on a storage system wherein disk managers 109a and 109b protect against corruptions using redundant array of independent disks (RAID) technology. That is, disk arrays 111a and 111b may be RAID disk arrays. A RAID disk array is an array of physical storage devices (e.g., disks) that are combined into one logical unit. Thus, for example, in FIG. 1, instead of five different disk drives, disk manager 109a (which may implement the RAID functionality) presents a single logical unit number (LUN) to file system 107a. RAID functionality also provides for the striping of data across multiple disks in the array and for the storage of parity information. That is, when processing a write operation, the content provided in the request may be striped across two or more disks in the array.

In addition, parity information may be computed for the content and stored on the disk array. The parity information is information that may be used to re-construct one or more corrupted bits of the content to be written. Thus, for example, when a content unit is written to a file in file system 107a, file system 107a may determine a corresponding block address at which the content unit is to be stored. Because file system 107a views disk array 111a as a single logical unit, and not as a collection individual storage devices, this block address may be a logical address that does not directly map to the physical blocks or sectors on the disks of disk array at which the content of the content unit is ultimately stored. Disk manager 109a may map the logical block address used by the file system to a set of block addresses on the disks of disk array 111a across which the content of the content unit is striped.

Aspects of the invention may be implemented on a storage system that uses any suitable error correction and/or protection (including any level of RAID technology) or on a storage system that does provide an error correction and/or protection, as the invention is not limited in this respect. When implemented on a storage system that does provide error correction and/or protection, the error correction and/or protection may be relied on by the CAS interface. That is, storage systems that are originally implemented as CAS systems may provide mechanisms that protect against data corruption and/or loss. However, when providing a CAS interface on an underlying block I/O storage system, the error correction and/or protection mechanisms of the block I/O storage system (e.g., RAID) may be used so that the CAS interface need not provide additional error correction and/or protection (although in some embodiments, it may).

Further, in some embodiments, content units stored may be stored on a storage system wherein a disk array managed by one controller may be mirrored to another disk array managed by a different controller. This may be done in any suitable way, as the invention is not limited to use with a storage system that employs any particular type of mirroring technique, or to employing mirroring at all. For example, when controller 103a receives a request to store a content unit, the content unit may be stored as a file in the file system and the content may unit be cached in a cache (not shown). Controller 103a may then send a request to controller 103b to store the content on a disk array managed by controller 103b (e.g., disk array 111b). The content may be asynchronously destaged by controller 103a from the cache to disk array 111a. Thus, a mirror copy of the content unit stored on disk array 111a is stored on disk array 111b. As a result, if disk array 111a or controller 111a fails, the content may be accessible through controller 111b and/or disk array 111b.

Figure 2:
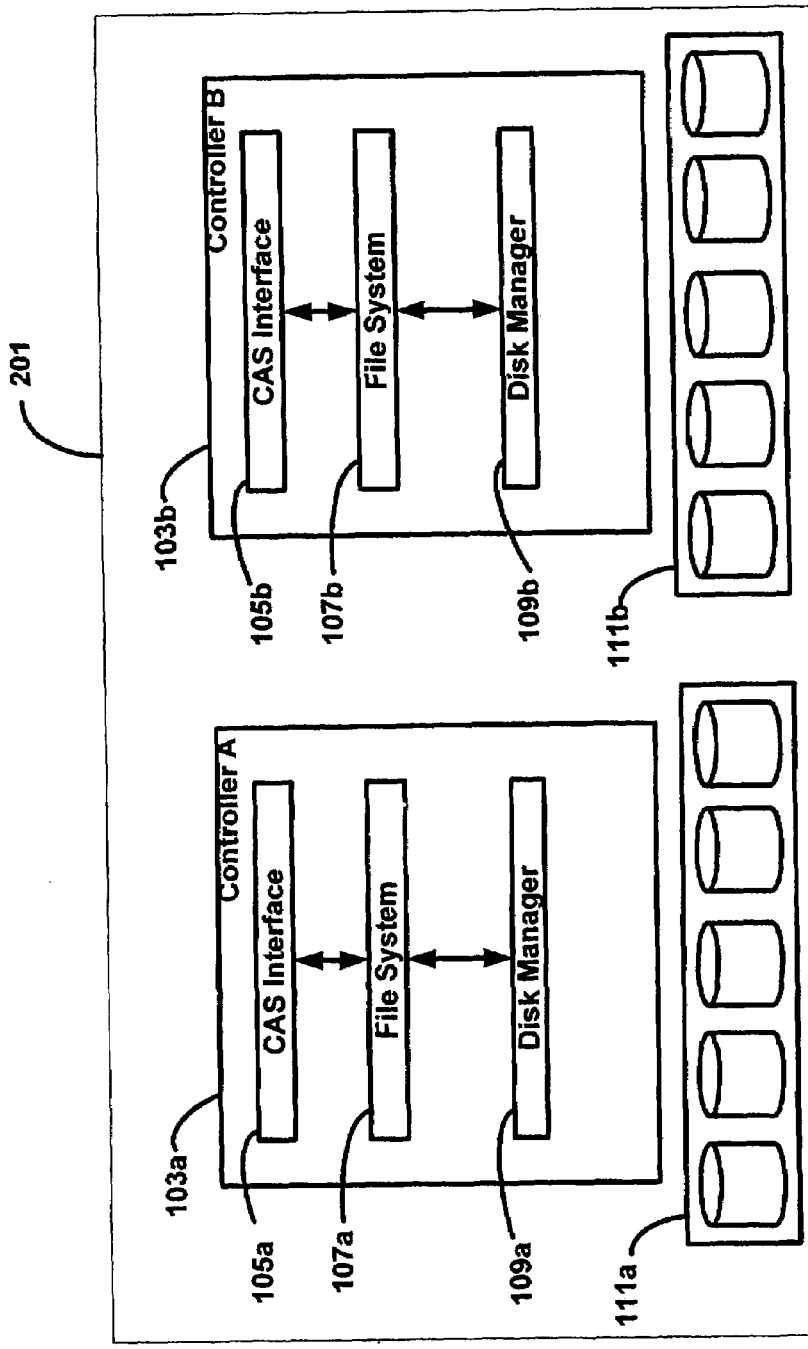
FIG. 2 is a diagram of the controllers of FIG. 1 disposed in the same storage system, in accordance with one embodiment of the invention.

In one embodiment, aspects of the present invention may be employed on a multi-processor storage system, such as storage system 201 shown in FIG. 2, wherein the storage system 201 includes both disk arrays 111a and 111b, and controllers 103a and 103b, which may be implemented as separate processors or as separate processing cores of the same processor. Thus, both disk arrays may be physically accessible to each controller in the storage system (e.g., each disk in the storage system may be physically coupled to the same SCSI or Fibre Channel bus).

In some storage systems, such as storage system 201, controller 103a may be configured to only access storage devices in disk array 111a and controller 103b may be configured to only access storage devices in disk array 111b. This may be done to prevent each controller from interfering with the I/O operations of the other controller. For example, if controller 103a attempts to read a block on disk at the same time that controller 103b is attempting to write the same block, then controller 103a may not read the correct data. This problem may be even more complex when disk arrays 111a and 111b are RAID disk arrays. For example, if controller 103a modifies a block in a stripe stored on one disk in the array at the same that controller 103b modifies a different block in the same stripe stored on a different disk, then both controllers may attempt to update the parity information for the stripe at the same time using different and incorrect parity values. As another example, if one of the disks in the RAID array is non-functional and controller 103b is attempting to reconstruct the data stored on the non-functional disk using the other blocks in the stripe and the parity information for the stripe and, at the same time, controller 103a is modifying one of the blocks in the same stripe, controller 103b may read the new data written by controller 103a but read the old parity information that controller 103a has not yet updated. This may cause controller 103b to reconstruct the data on the non-functional disk incorrectly.

Thus, in some embodiments, the disks in the storage system may be allocated to each controller so that the one controller does not interfere with the disk operations of another controller. For example, in FIG. 2, disk array 111a may be allocated to controller 103a and disk array 111b may be allocated to controller 103b. Such an allocation may be accomplished in any suitable way, as the invention is not limited in this respect. For example, a user or administrator may configure storage system 201 so that certain disks are allocated to each controller. Thus, each controller accesses only the disk arrays that are allocated to it.

In one embodiment, each of CAS interfaces 105a and 105b presents itself to application program 101 as a separate node. That is, each controller 103 is separately addressable and has its own network address (e.g., IP address) at which the CAS interface may receive access requests from the application program. In the example of FIG. 2, the CAS interface is co-located with software that performs the underlying block I/O storage functionality (i.e, the disk manager). Thus, in some embodiments, the CAS interface and the disk manager may be software entities that execute on the same controller (e.g., processor).

As shown in FIG. 2, a file system 107 may also be provided on each controller 103. As discussed in greater detail below, the CAS interface may store content units in the file system, which is mapped to the underlying disk array that is managed by the controller on which the file system executes.

Applicants have appreciated that when an entity (e.g., an application program or a host computer) stores a content addressable content unit on storage system 201, it is desirable to free the storing entity from tracking on which disk array and/or by which controller of storage system 201 the content unit is stored. For example, if an application program sends a content unit to controller 103a of storage system 201 for storage, controller 103a may physically store the content unit on disk array 111a. If the application program later attempts to retrieve the stored content unit from storage system 201, it may be burdensome to require that the application program send the read request for the content unit to the same controller that processed the write request for the content unit. Thus, in one embodiment, an entity accessing storage system 201 need not track which controller or which disk array of storage system 201 stores a content unit that was previously written to the storage system. This may be accomplished in any suitable way, as the invention is not limited in this respect.

For example, when an entity (e.g., application program 101 in FIG. 1) sends a write request to storage system 201 to store a content unit, it may send the request to either controller 103a or 103b. The entity may select the controller to which to store the request in any suitable way, as the invention is not limited in this respect. For example, the entity may use a load balancing scheme to select the controller, such as alternating the controller to which successive requests are sent (though any suitable load balancing scheme may be used). The controller 103 that receives the request may store it on its respective disk array 111. If the entity later desires to retrieve the content unit from storage system 201, it may send a read request that specifies the content address of the content unit to either controller 103a or 103b. The controller that receives the read request may determine if the content unit is stored on its disk array. This may be done in any suitable way, as the invention is not limited in this respect. For example, the controller may search its file system 107 to determine if the content unit is stored therein. If the controller that receives the read request stores the requested content unit, then the controller may process the read request and return the requested content unit to the entity. If the controller that receives the read request does not store the requested content unit, the controller may cause the requested content unit to be read from the other controller. This may be done in any suitable way, as the invention is not limited in this respect.

In one embodiment, to cause the requested content unit to be read from the other controller, the controller that received the read request may redirect the requesting entity to the proper controller. This may be done in any suitable way. For example, the receiving controller may send a response to the requesting entity to resend the read request to the other controller.

In another embodiment, the controller that received the read request may cause the requested content unit to be read from the other controller by instructing the other controller to respond to the access request. This may be done in any suitable way, as the invention is not limited in this respect. For example, if controller 103a receives a read request for a content unit that it does not store, it may relay the read request to controller 103b. Controller 103b may then retrieve the requested content unit and respond to the requesting entity directly or pass the content unit to the controller 103a that received the request, which can return it to the requesting entity.

Figure 3:
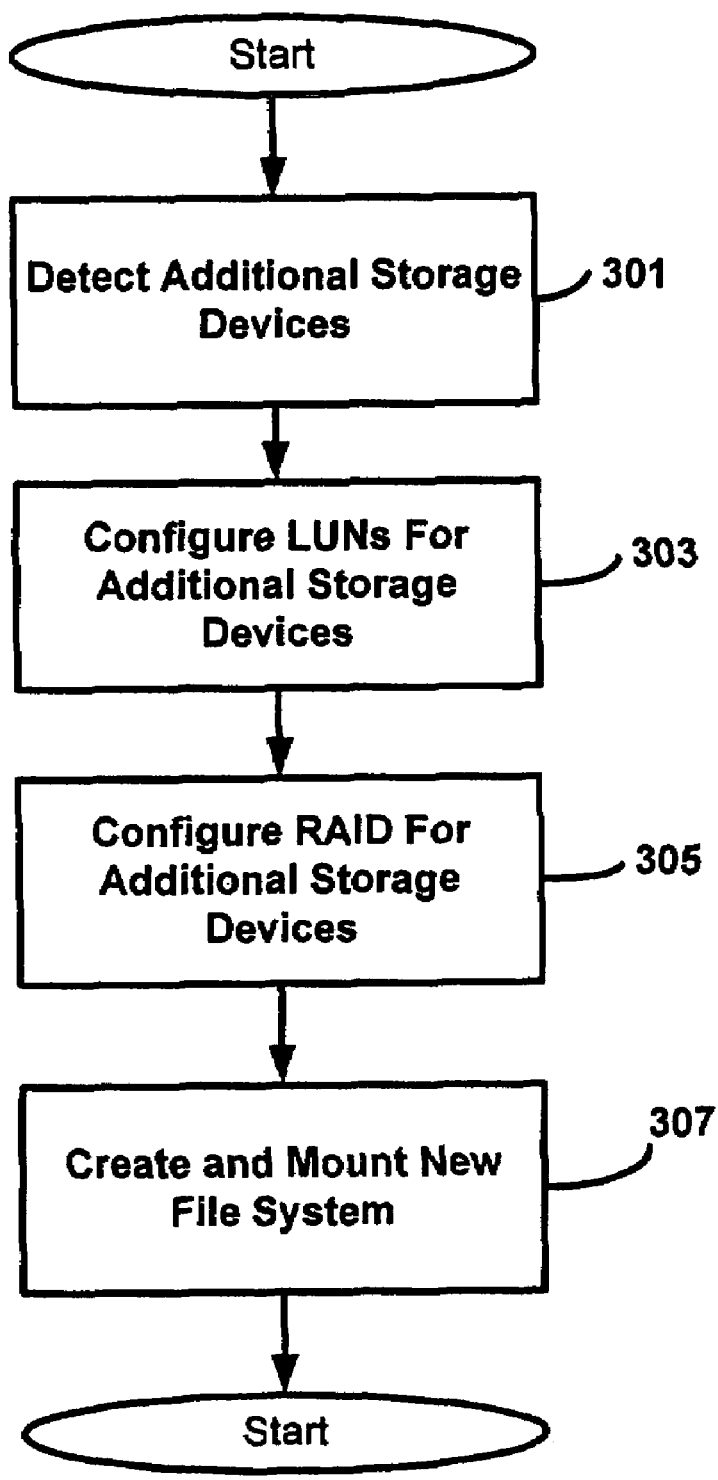
FIG. 3 is a flow chart of an illustrative process for adding additional devices to a storage system and automatically configuring the additional devices, in accordance with one embodiment of the invention.

As content is written to storage system 201, the disks in disk arrays 111a and 111b may eventually reach capacity. Applicants have appreciated that it may be desirable to increase the storage capacity of storage system 201 at a time when the storage system is populated with content units. This may be done in any suitable way, as the invention is not limited in this respect. In one embodiment, a user must manually configure the storage system to accept and use additional storage devices. In another embodiment, additional storage devices may be added to the storage system (e.g., by connecting the additional storage devices to the existing SCSI bus or Fibre Channel loop) and these additional storage devices may be detected and automatically configured by the storage system. For example, as shown in the process of FIG. 3, at act 301, the additional storage devices that have been added to the system may be detected by the storage system. Any suitable type of additional storage devices may be used, as the invention is not limited in this respect. In one embodiment, the added storage devices may be a disk array enclosure (DAE), which is a box of disks that has Fibre Channel connectivity.

After the additional devices have been detected, the process continues to act 303, where bus addresses (e.g., LUNs) may be configured for the additional storage devices. That is, each disk may be assigned a LUN and each LUN may be allocated to one of the controllers in the storage system. In embodiments in which the added storage devices are in a DAE, a LUN may be preconfigured for each disk in the DAE, and thus, it may not be necessary to configured a LUN for each disk.

Next, the process continues to act 305 where RAID may be configured for the additional storage devices (i.e., the storage devices may be grouped into RAID arrays and the level of RAID protection may be selected and a LUN for each new RAID array may be presented). In addition, a virtual LUN, which serves as a LUN for the disks in the RAID array, may be configured and presented. Of course, the invention is not limited to use on a storage system that uses RAID, as other (or no) error correction and/or protection schemes can be employed. The process then continues to act 307 where a new file system may be created and mounted to allow content units to be stored, via the file system, on the additional storage devices.

The configuration of the additional storage devices may be performed by any suitable entity. In one embodiment, utility software that executes on the controllers 103a and 103b may be responsible for the configuration of additional storage devices.

In the example of FIG. 3, a new file system is created for storing content units on the additional storage devices. However, the invention is not limited to creating an additional file system to allow content units to be stored on the additional storage devices, as one or more of the existing file systems 107a and 107b may be expanded to use the additional storage devices. Any file system capable of being expanded to use the additional storage devices may be employed, as the invention is not limited in this respect. Many file systems have maximum object counts that limit the number of files that can be stored in the file system. Thus, even if a file system is capable of being expanded to the additional storage devices, it may be desirable to create a new file system so that the maximum object count is not reached.

Figure 4:
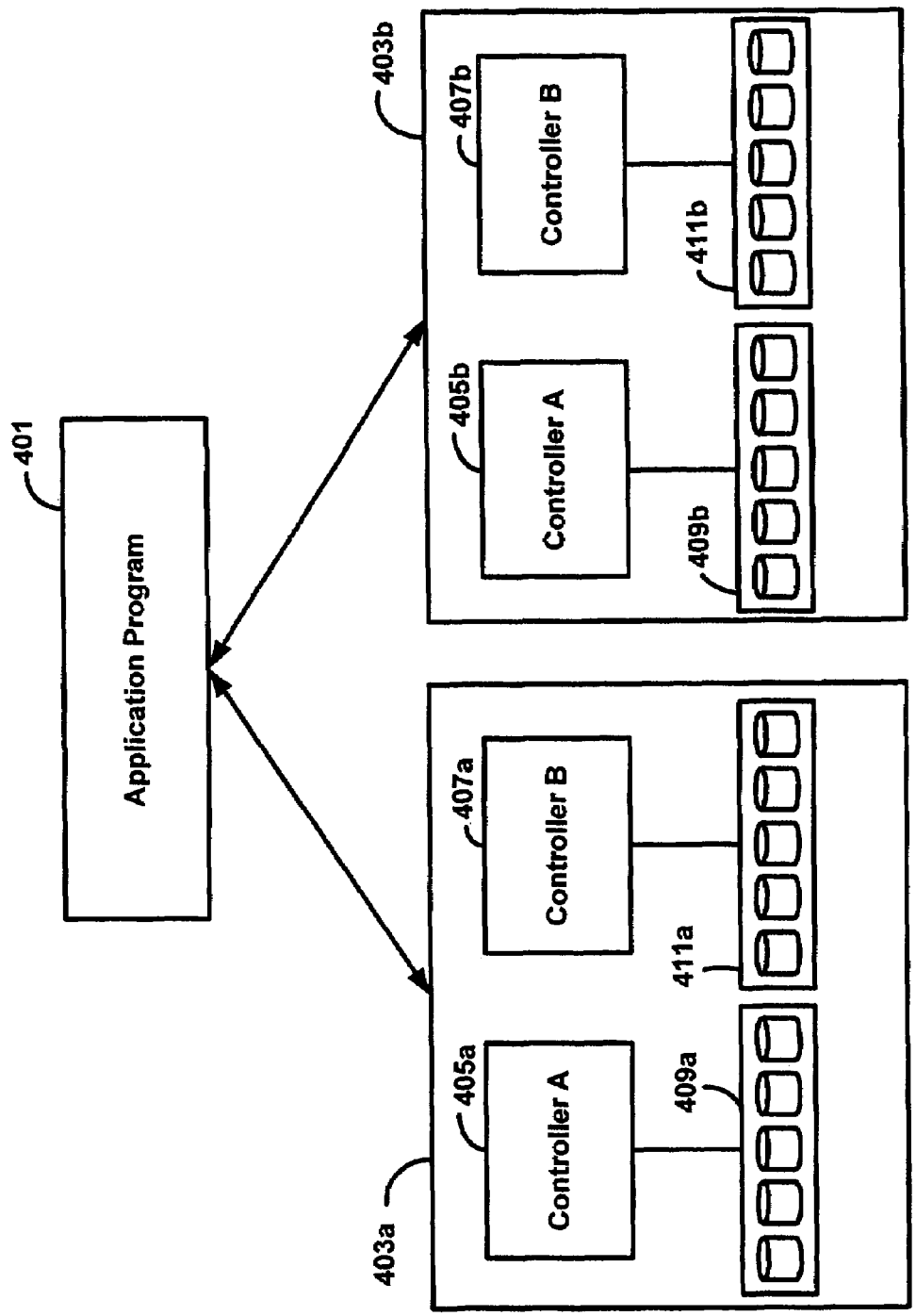
FIG. 4 is a diagram of a federation of multiple storage systems, in accordance with one embodiment.

It some situations, it may not be possible to add additional storage devices to the system. That is, for example, the SCSI and Fibre Channel standards impose a limit on the number of devices that may be supported on a bus or loop. If this limit is reached, it may not be possible to add additional storage devices to the storage system. In accordance with one embodiment, rather than (or in addition to) adding additional storage devices to the storage system (i.e., storage system 201 in FIG. 2), additional storage systems may be used. For example, as shown in FIG. 4, application program 401 may store content units on either storage system 403a or 403b. Each storage system 403 may have two controllers (e.g., 405a and 407a in storage system 403a, and 405b and 407b in storage system 403b), and each controller may be allocated a plurality of storage devices (e.g., 409a, 411a, 409b, and 411b).

In one embodiment, the storage systems 403a and 403b comprise a federation of storage systems that allow an entity (e.g., application program 401) to send an access request to read a content unit to any controller in the system, regardless of on which storage device or disk array the content unit is stored. This may be accomplished in any suitable way, as the invention is not limited in this respect. Examples of creating federations of CAS systems are described in greater detail in the U.S. patent application Ser. Nos. 10/787,337 and 10/787,670, listed below in Table 1.

In one embodiment, when an access request is received by a controller, the controller may first determine if it stores the requested content unit. If it does, then it may process the access request. If it does not, then it may broadcast a message to the other controllers inquiring as to whether any of the other controllers store the requested content unit. The controller that stores the requested content unit may respond to the controller that issued the broadcast message (i.e., the controller that originally received that access request) indicating that it stores the requested content unit. The controller that originally received the access request may then send a response to the requesting entity instructing the requesting entity to re-send the request to the controller that stores the content unit.

In another embodiment, after the controller that originally received the access request sends the broadcast message and determines which controller stores the content unit, the controller that originally received the access request may relay the access request to the controller that stores the content unit and the controller that stores the content unit may return the content unit to the controller that originally received the access request. The controller that originally received the access request may then return the content unit to the requesting entity. Alternatively, the controller that stores the content unit may return the content unit directly to the requesting entity.

In the example computer system of FIG. 4, a single additional storage system (i.e., storage system 403b) was added to provide additional storage space in connection with the original storage system (i.e., storage system 401). However, the aspect of the invention that relates to employing a federation of multiple storage systems is not limited in this respect, as any suitable number of storage systems may be employed.

In one embodiment of the invention, when one controller in a storage system fails, the content units stored on the storage devices allocated to the failed controller may be accessed through the other controller in the storage system. This may be done in any suitable way, as this aspect of the invention is not limited to any particular implementation technique.

Figure 5:
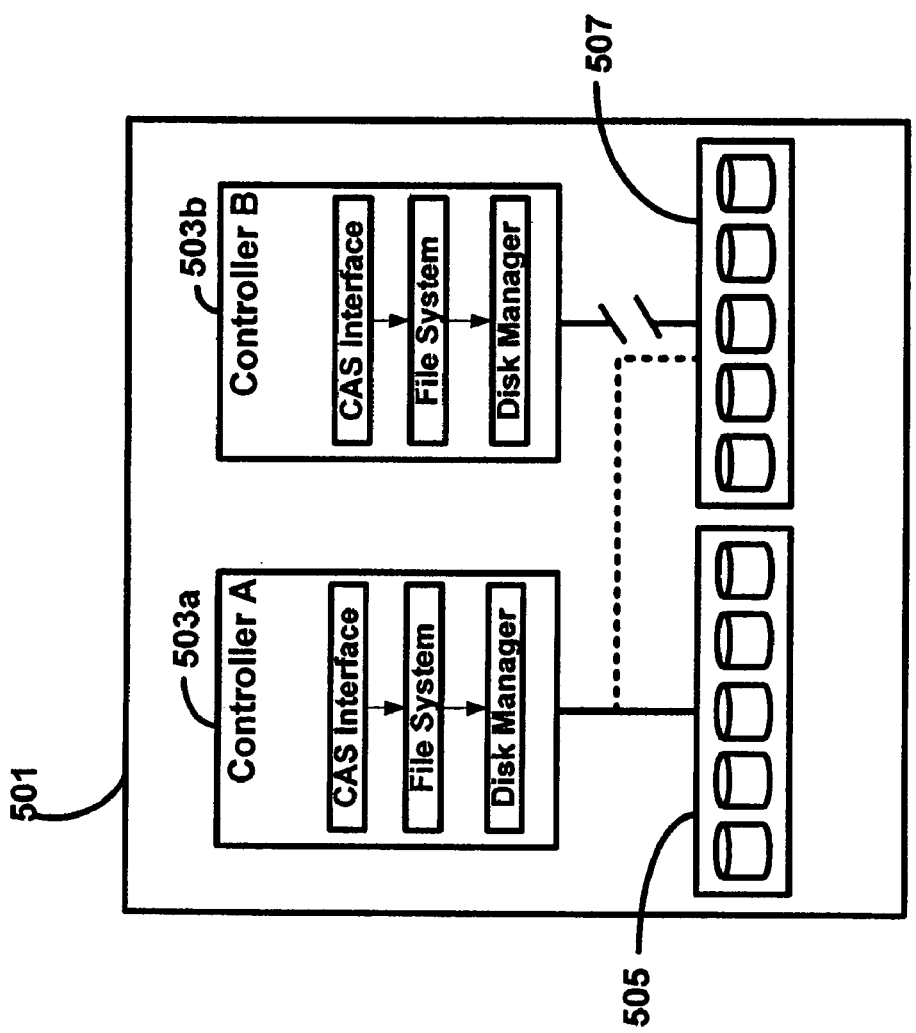
FIG. 5 is a diagram of a storage system wherein a controller may trespass on the storage devices allocated to another controller, in accordance with one embodiment.

For example, in one embodiment, each controller in the storage system may monitor whether the other storage processor is still functional. This may be done in any suitable way, as the invention is not limited in this respect. For example, each controller may have a heartbeat utility that periodically sends a "heartbeat" message to determine if the other controller is still functional. When a controller receives a heartbeat message, it may respond to the controller that issued the message to indicate that it is still functional. If a controller ceases to respond to "heartbeat" messages, the other controller may presume that the non-responding controller is no longer functional. Once a controller determines that the other controller in the storage system is no longer functional, it may "trespass" the storage devices that are allocated to the failed controller to continue to provide access to content units stored via the failed controller. For example, as shown in FIG. 5, storage system 501 includes controller 503a and controller 503b. Disk array 505 is initially allocated to controller 503a and disk array 507 is initially allocated to controller 503b. Prior to any failures, the only active path for access to content units on disk array 505 is via controller 503a and the only active path for access to content units on disk array 507 is via controller 503b. If controller 503b fails (e.g., due to hardware failure) there is no longer an active path to disk array 507 via controller 503b (as indicated by the broken line between controller 503b and disk array 507). According to one embodiment, a previously non-active path to disk array 507 via controller 503a may be established (as indicated by the dashed line between disk array 507 and controller 503a). This may be done in any suitable way, as the invention is not limited in this respect. In one embodiment, this may be performed automatically (i.e., without the intervention of a user or administrator) and in a manner transparent to an entity accessing the content, but all aspects of the invention are not limited in this respect.

Figure 6:
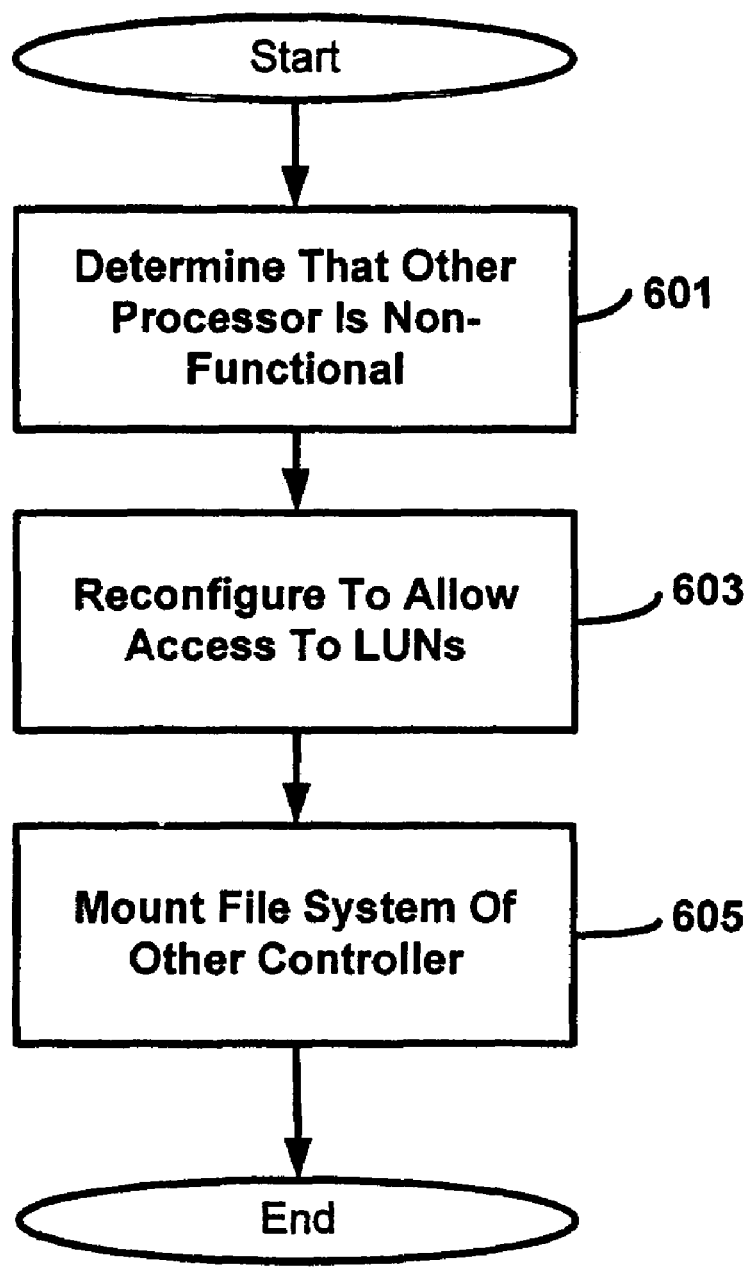
FIG. 6 is a flow chart of an illustrative process for trespassing on storage devices allocated to a non-functional controller.

FIG. 6 is an example of a process for activating a path between a controller (e.g., 503a) and a disk array previously allocated to a failed controller (e.g., disk array 507), in accordance with one embodiment. At act 601, the functional controller (i.e., controller 503a) determines that the other controller (e.g., controller 503b) in the storage system is no longer functional. This may be done in any suitable way (e.g., using a heartbeat technique), as the invention is not limited in this respect. The process then continues to act 603, where the functional controller is reconfigured to allow it to access the storage devices (e.g., LUNs) allocated to the non-functional controller. As discussed above, each storage device in the storage system is physically accessible to both controllers, as the physical connection to each storage device (e.g., the SCSI bus or Fibre Channel loop) is accessible to each controller. However, each controller may have been configured to only access the storage devices that are allocated to it to avoid interfering with operations of the other controller. When one of the controllers fails, this configuration may be overridden and the functional controller may be reconfigured to be permitted access to all storage devices (e.g., LUNs).

The process then continues to act 605, where the file system of the failed controller is mounted on the functional controller. This allows the file system accesses to the file system of the failed controller to be processed by the functional controller. For example, the functional controller 503a may receive a CAS request to access a content unit stored on disk array 507.

The controller 503a may determine the location of the content unit in the newly mounted file system (i.e., the file system of non-functional controller 503b) using the content address specified in the request. The file system location may then be mapped to the physical location of the requested content unit on disk array 507.

Figure 7:
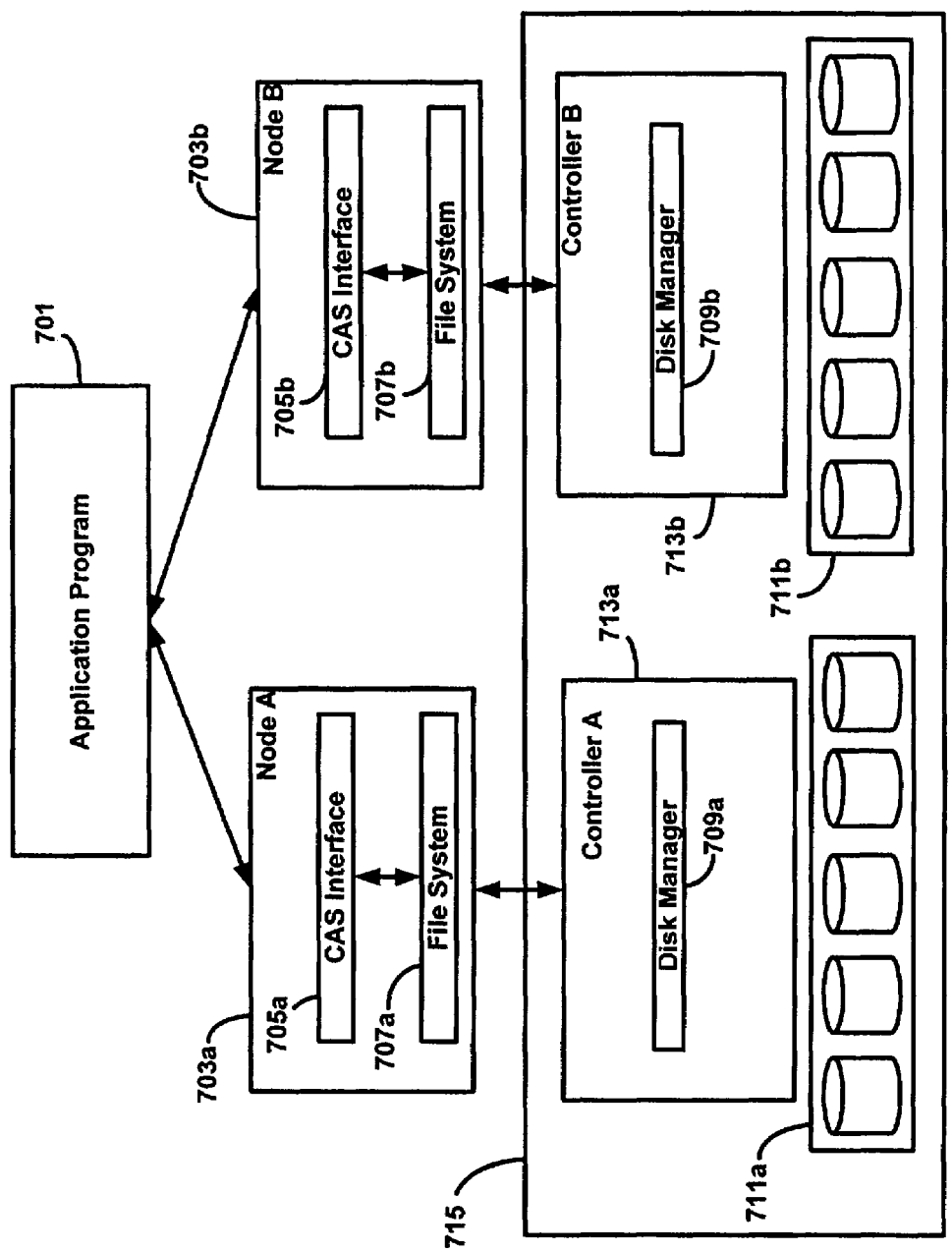
FIG. 7 is a diagram of a storage system having a CAS interface that is not co-located with the storage disks and the disk manager, in accordance with one embodiment.

In the examples described above, the CAS interface 105 and file system 107 (FIG. 1) are co-located (i.e., on the same controller) with the disk manager 109 (FIG. 1). However, the invention is not limited in this respect, as the CAS interface 105, file system 107, and disk manager 109 need not be co-located, as these entities may be located on different nodes and/or processors. For example, as shown in FIG. 7, CAS interface 705a and file system 707a are located on node 703a (Node A), which is a separate computer with separate processing resources from storage system 715 on which disk manager 709a is located. Similarly, CAS interface 705b and file system 707b are located on node 703b (Node B), which is also a separate computer with separate processing resources from storage system 715. Because nodes 703a and 703b provide access to storage system 715 via a CAS interface, these nodes may be referred to herein as CAS interface nodes or access nodes. Because controllers 713a and 713b access the underlying storage devices 711a and 711b, these controllers may be referred to herein as storage nodes. Nodes A and B may implemented in any suitable way. For example, the nodes may be implemented on separate processors in the same box or computer, separate processors in different boxes or computers, or even as a single processor.

In the system of FIG. 7, node 703a has a direct connection to controller 713a of storage system 715 and does not have a connection to controller 713b. Similarly, node 703b has a direct connection to controller 713b and does not have a connection to controller 713a. Application program 701 may send access requests to either node 703a or node 703b and the node that receives the access request may determine if the requested content unit stored in the request is stored in the file system (707a or 707b) of that node. If it is, then the node may map the file system location to a block address and send a request to the controller 713 to which it has a connection that results in retrieving the content unit from the storage device(s) (i.e., 711a or 711b) allocated to it. If the node that receives the access request does not store the requested content unit, then it may cause the other node to receive the request. This may be done in any suitable way, as the invention is not limited in this respect. For example, in one embodiment, the node that receives the request may send a response redirecting the entity that issued the request (e.g., application program 701) to the other node and the entity may then issue another request directly to the other node. In another embodiment, the node that issued the request, after determining that it does not store the content unit, may relay the request to the other node. In response, the other node may return the requested content unit to the node that received the request, and the node that received the request may forward the content unit to the requesting entity. Alternatively, the node that stores the content unit may return the content unit directly to the request entity.

The computer system of FIG. 7 may also include a utility node (not shown) that aids in the configuration of additional storage devices. For example, the utility node may, at intervals, poll disk managers 709a and 709b to determine if any new storage devices have been added to storage system 715. If there are new storage devices, the utility node may instruct disk manager 709a and/or disk manager 709b to configure new LUN(s). The utility node may then create and mount a new file system or multiple new file systems on node 703a and/or 703b, which map to the additional storage devices. This allows the access nodes to use the storage space provided by the new storage devices.

As discussed above, it may sometimes be desirable to add another storage system to the computer system to increase the overall storage capacity of the computer system. When another storage system is added to the computer system and the CAS interface and file system are not located on the storage system, two additional nodes that each execute a CAS interface and file system may be added to the computer system to provide a CAS interface to each controller on the additional storage system. For example, in one embodiment, each new storage system may be configured like those described above and have two controllers, and a separate node (e.g., a server) having a CAS interface and a file system may be added for each controller.

Figure 8:
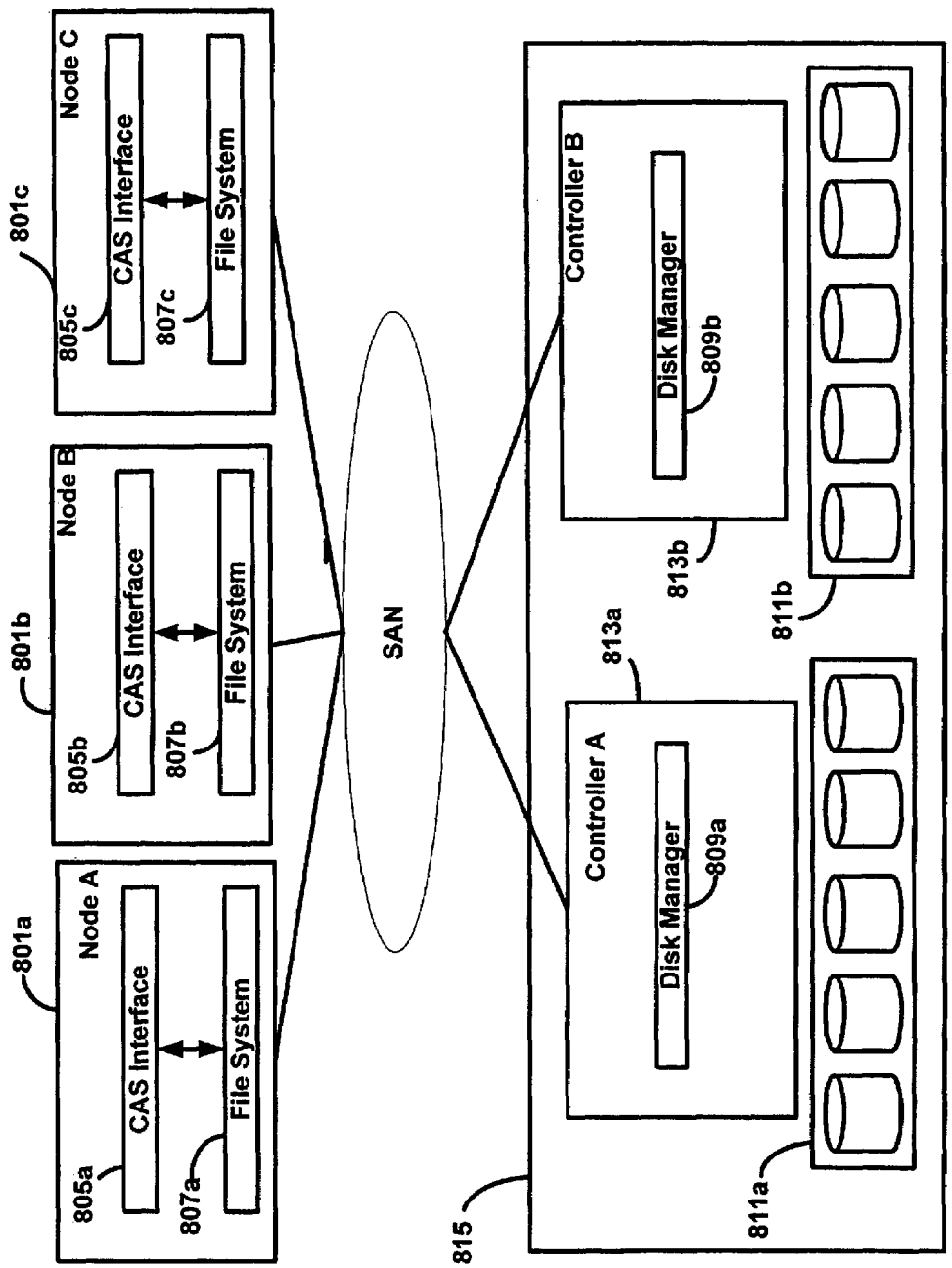
FIG. 8 is a diagram of storage system having a CAS interface that is not co-located with the storage disks and the disk manager and in which access nodes and storage nodes are coupled by a storage area network, in accordance with one embodiment.

In the example of FIG. 7, each CAS interface node has a direct connection to one of the controllers so that access requests for content unit are processed by the controller that stored the content unit. However, the invention is not limited in this respect. For example, in one embodiment, shown in FIG. 8, CAS interface nodes may access one or more storage systems (although only one is shown in FIG. 8) through a network (e.g., a storage area network (SAN)) that couples disk controllers (i.e., controllers 813a and 813b) of the storage system(s) to the CAS interface nodes and servers (i.e., nodes 801*a*, 801*b*, and 801*c*). Thus, in the system of FIG. 8, each node 801 may communicate with each controller 813. Further, the nodes 801 may communicate with each other. Thus, for example, if node 801*a* fails, nodes 801*b* and 801*c* may negotiate which of them is to take over for node 801*a* (e.g., by mounting the file system of node 801*a*). In addition, if new storage devices or a new storage system is added to the system, the nodes 801 may determine which node 801 may map a file system on to the additional storage devices.

In one embodiment of the invention, rather than each node 801 having a separate file system 807, the file system 807 may be a distributed file system that is shared by multiple nodes over a network. Thus, each node mounts the same distributed file system and any modification to the file system by a single node (e.g., creation, deletion, or modification of a file or directory), is reflected in the file system that is mounted by every other node. As a result, every content unit stored in the distributed file system is accessible to each node 801. Thus, an accessing entity (e.g., an application program) may send an access to request to any node 801 of the computer system and that node will be able to determine the file system location of the content unit, map the file system location to a block address (e.g., a LUN) and send an access request to the controller 813 of storage system 815 that presents that particular LUN. Because each node 801 is capable of determining the file system location of every content unit and because each node 801 has access to each controller 813, the redirection or relay of access requests, described above in connection with other embodiments, are not necessary.

The distributed file system may be implemented in any suitable way, including using any available distributed file system technology, as the invention is not limited in this respect.

The example of FIG. 8 includes three nodes 801 (i.e., access nodes) and one storage system having two controllers (i.e., storage nodes). However, the aspect of the invention that involves the use of a network between CAS access nodes and storage systems is not limited in this respect, as any suitable number of access nodes may be used and the computer system may include any suitable number of storage systems.

In one embodiment, an additional utility node may be included in the system that does not process access requests, but rather performs other operations on the content units accessed by the storage system to save processing resources of the access and/or storage nodes. For example, a copy of one or more content units stored on the storage system may be made and stored on the utility node. Thus, the utility node may perform operations on the data without using the processing resources of the access nodes or storage nodes. The utility node may perform any suitable operation on the data, as the invention is not limited in this respect. Such operations may include, for example, determining whether content units have been corrupted or modified, which may be done in any suitable way. When the storage system provides one or more utilities (e.g., a SNAP copy) to efficiently produce a copy, these utilities may be used to create a copy for the utility node.

In the example above, the computer system includes only a single utility node. However, the invention is not limited in this respect, as the system may include two, three, or any other suitable number of utility nodes.

In one embodiment, to determine whether a content unit has been modified or corrupted, the utility node may re-compute the content address using the content of a content unit and determining if the re-computed content address matches the content address originally assigned to the content unit. Another operation that may be performed by the utility node is garbage collection. That is, the utility node may determine if there are any content units that are no longer in use and should be deleted. Garbage collection may be performed in any suitable way. Examples of how garbage collection may be performed on content addressable content units are described in the applications listed below in Table 1. Another example of an operation that may be performed by the utility node is determining if retention periods have expired. In some embodiments, a content unit may be assigned a retention period that specifies a period of time during which the content unit may not be deleted. Retention periods are described in greater detail in the applications listed below in Table 1. The utility node may determine which content units have expired retention periods and thus are available for deletion.

In some examples described above, content addressable storage techniques and content addresses are employed in storing and accessing content units. However, the invention is not limited in this respect, as any storage techniques and addresses may be used. In some embodiments, object addressable storage and object identifiers may be used, wherein, as with CAS, a content unit is given an object address, though the object address need not be computed using the content of the content unit. That is, content addresses may be thought of as a specific type of object identifiers, wherein the addresses are computed using the content of the content unit.

In object addressable storage, a content unit may be identified (e.g., by host computers requesting access to the content unit) using its object identifier and the object identifier may be independent of the physical or logical location at which the content unit is stored (thought it is not required to be). However, from the perspective of the host computer, the object identifier does not control where the content unit is stored.

The above-described embodiments of the present invention can be implemented on any suitable computer or system. Examples of suitable computers and/or systems are described in the patent applications listed below in Table 1 (collectively "the CAS applications"), each of which is incorporated herein by reference. It should be appreciated that the computers and systems described in these applications are only examples of computers and systems on which the embodiments of the present invention may be implemented, as the invention is not limited to implementation on any of these content addressable storage systems, or to content addressable storage systems at all.

TABLE 1

| Title | Ser. No. | Filing Date |
| --- | --- | --- |
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |

TABLE 1-continued

| Title | Ser. No. | Filing Date |
|---|---|---|
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention.

The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An object addressable storage (OAS) system, comprising:
    a plurality of storage devices to store a plurality of content units; and
    at least one processor programmed to:
    provide an OAS interface so that each one of the content units stored on the OAS system can be accessed using an object identifier;
    discover the addition of newly added storage devices to the plurality of storage devices after the OAS system has been at least partially populated so that at least some of the plurality of storage devices have content units already stored thereon; and
    in response to the discovery of newly added storage devices, configure the newly discovered storage devices to increase the storage capacity of the OAS system and to enable content units to be stored thereon.

2. The OAS system of claim 1, wherein the at least one processor is programmed to configure the newly discovered storage devices by creating at least one file system that enables content units to be stored on the newly discovered storage devices and accessed via their corresponding object identifiers.

3. The OAS system of claim 1, wherein the at least one processor is programmed to configure the newly discovered storage devices to provide fault tolerance capabilities for content units to be stored thereon.

4. The OAS system of claim 3, wherein the fault tolerance capabilities are redundant array of independent disks (RAID) capabilities.

5. The OAS system of claim 1, wherein the OAS system is a content addressable storage (CAS) system and the at least one processor is programmed to provide a CAS interface so that each one of the content units stored on the CAS system can be accessed using a content address that is based, at least in part, on the content of the one of the content units.

6. The OAS system of claim 1, wherein the at least one processor is programmed to configure the newly discovered storage devices by presenting a logical unit number (LUN) that serves as an address for the storage devices.

7. A method of increasing the storage capacity of an object addressable storage (OAS) system comprising a plurality of storage devices to store a plurality of content units, wherein the OAS system provides an OAS interface through which each one of the content units stored on the OAS system can be accessed using an object identifier, and wherein the method comprises:
    discovering the addition of newly added storage devices to the plurality of storage devices after the OAS system has been at least partially populated so that at least some of the plurality of storage devices have content units already stored thereon; and
    in response to the discovery of newly added storage devices, configuring the newly discovered storage devices to increase the storage capacity of the OAS system and to enable content units to be stored thereon.

8. The method of claim 7, wherein the act of configuring further comprises:
    configuring the newly discovered storage devices by creating at least one file system that enables content units to be stored on the newly discovered storage devices and accessed via their corresponding object identifiers.

9. The method of claim 7, wherein the act of configuring further comprises:
    configuring the newly discovered storage devices to provide fault tolerance capabilities for content units to be stored thereon.

10. The method of claim 9, wherein the fault tolerance capabilities are redundant array of independent disks (RAID) capabilities.

11. The method of claim 7, wherein the OAS system is a content addressable storage (CAS) system, wherein the object identifier is a content address that is based, at least in part, on the content of the one of the content units, and wherein the OAS interface is a CAS interface through which each one of the content units stored on the CAS system can be accessed using the content address.

12. The method of claim 7, wherein the act of configuring further comprises:
    presenting a logical unit number (LUN) that serves as an address for the storage devices.

13. At least one computer readable medium encoded with instructions that, when executed on an object addressable storage (OAS) system, perform a method of increasing the storage capacity of the OAS system, wherein the OAS system comprises a plurality of storage devices to store a plurality of content units, wherein the OAS system provides an OAS interface through which each one of the content units stored on the OAS system can be accessed using an object identifier, and wherein the method comprises:
    discovering the addition of newly added storage devices to the plurality of storage devices after the OAS system has been at least partially populated so that at least some of the plurality of storage devices have content units already stored thereon; and
    in response to the discovery of newly added storage devices, configuring the newly discovered storage devices to increase the storage capacity of the OAS system and to enable content units to be stored thereon.

14. The at least one computer readable medium of claim 13, wherein the act of configuring further comprises:
    configuring the newly discovered storage devices by creating at least one file system that enables content units to be stored on the newly discovered storage devices and accessed via their corresponding object identifiers.

15. The at least one computer readable medium of claim 13, wherein the act of configuring further comprises:

configuring the newly discovered storage devices to provide fault tolerance capabilities for content units to be stored thereon.

16. The at least one computer readable medium of claim 15, wherein the fault tolerance capabilities are redundant array of independent disks (RAID) capabilities.

17. The at least one computer readable medium of claim 13, wherein the OAS system is a content addressable storage (CAS) system, wherein the object identifier is a content address that is based, at least in part, on the content of the one of the content units, and wherein the OAS interface is a CAS interface through which each one of the content units stored on the CAS system can be accessed using the content address.

18. The at least one computer readable medium of claim 13, wherein the act of configuring further comprises:
   presenting a logical unit number (LUN) that serves as an address for the storage devices.

* * * * *